US006708276B1

(12) United States Patent
Yarsa et al.

(10) Patent No.: US 6,708,276 B1
(45) Date of Patent: Mar. 16, 2004

(54) ARCHITECTURE FOR DENIED PERMISSIONS IN JAVA

(75) Inventors: Julianne Yarsa, Austin, TX (US); Bruce Arland Rich, Round Rock, TX (US); Theodore Jack London Shrader, Austin, TX (US); Donna Skibbie, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/366,403

(22) Filed: Aug. 3, 1999

(51) Int. Cl.[7] .................................................. G06F 9/44

(52) U.S. Cl. ........................ 713/201; 713/200; 713/166; 713/167; 709/315; 709/316; 709/331; 709/332; 707/102; 707/103; 707/104; 717/166

(58) Field of Search ................................. 713/164, 166, 713/167, 201, 200; 709/315, 316, 331, 332; 707/102, 103, 104; 717/166

(56) References Cited

U.S. PATENT DOCUMENTS 4,713,753 A 12/1987 Boebert et al. ............. 364/200
5,265,221 A 11/1993 Miller ........................ 395/725
5,535,375 A 7/1996 Eshel et al. ................. 391/500
5,579,222 A 11/1996 Bains et al. ................ 395/712
5,677,851 A 10/1997 Kingdon et al. ........ 364/514 C
5,680,452 A 10/1997 Shanton ......................... 380/4
5,706,502 A * 1/1998 Foley et al. .................. 707/10
5,778,222 A 7/1998 Herrick et al. .............. 395/609
5,784,560 A 7/1998 Kingdon et al. ....... 395/200.31
5,802,276 A 9/1998 Benantar et al. ............ 395/186
5,802,530 A 9/1998 Van Hoff ..................... 707/513
5,864,676 A 1/1999 Beer et al. ............. 395/200.59
5,987,608 A * 11/1999 Roskind ...................... 713/200
6,226,654 B1 * 5/2001 Van Hoff ................. 715/501.1
6,345,361 B1 * 2/2002 Jerger et al. ................ 713/200

OTHER PUBLICATIONS

Zukowski and Rohaly; "Fundamentals of Java Security" Nov. 1998, Mangelang Institute, Copyright Nov. 1998 Sun Microsystems Inc. <http://developer.java.sun.com/developer/onlineTraining/Security/Fundamentals/abstract.html>.*

* cited by examiner

*Primary Examiner*—Gregory Morse
*Assistant Examiner*—Paul Callahan
(74) *Attorney, Agent, or Firm*—Jeffrey S. LaBaw; Joseph R. Burwell

(57) ABSTRACT

An architecture for extending the Java security model to allow a user or administrator to explicitly deny permissions. By itself, the Java 2 security model does not allow additions to the collections of policy permissions after they have been loaded from the Java policy file. The inventive architecture allows Java applets and applications to dynamically prompt the user to deny a permission that does not exist in the Java policy file. If the user denies the permission, the present invention denies the permission for the ProtectionDomain to which the class asking for the permission belongs. Attributes for the denied permission may be set during runtime and saved across browser sessions.

16 Claims, 6 Drawing Sheets

PROCESSOR 12
OS 15
PERMISSIONS MODULE 18
JRE 16
JAVA PLUG-IN 17
SYSTEM MEMORY 13
WEB BROWSER 20
10
14

ARCHITECTURE FOR DENIED PERMISSIONS IN JAVA

BACKGROUND OF THE INVENTION

1. Technical Field

The present invention relates generally to an architecture for extending the Java Security Model to allow a user or an administrator to explicitly deny permissions statically or dynamically, i.e. during runtime.

2. Description of the Related Art

Java, originally developed by Sun Microsystems, is a known software programming environment in which software programs, known as Java applets or applications, are developed, tested and maintained. Java programs have found extensive use on the World Wide Web, which is the Internet's multimedia information retrieval system.

A capabilities-based access control model is one in which a user possesses a capability token that defines the user's permissible access to resources. The Java 1.2 security model is capabilities-based, wherein Java classes or class instances are resource users and the class's associated ProtectionDomain defines its capabilities with a set of Java permissions. In the Java 1.2 reference implementation, the permissions (capabilities) associated with each class are specified in one or more policy files, read in, and used to instantiate a Java Virtual Machine (JVM) Policy object and class ProtectionDomains. In that implementation, all denial of access is implicit, a result of the omission of an explicitly granted permission. There is no support for explicitly denied permissions.

Recently, Sun's JavaSoft introduced the Java 2 development platform. The Java 2 Java runtime environment (JRE) includes a Plug-in that allows developers and users to run applets in their web browsers with different JREs. The ability to specify other JREs allows developers to call Java 2 methods within their applets. Moreover, in the Java 2 security model, administrators or users can easily grant access to a large group of related objects. For example, to grant read access to all files under c:\mydirectory, the administrator specifies the following Java permission:

java.io.FilePermission "c:\mydirectory*","read" The administrator, however, has no easy way to grant access to a large collection of related objects while denying access to one object or a small subset of them. For example, to grant read access to all the files under c:\mydirectory except for c:\mydirectory\private.txt, the administrator would need to specify individual permissions for each of the accessible files. Clearly, this is an impractical or even impossible task in many situations. Moreover, by using multiple policy files and Java permissions containing wildcards, it is possible to inadvertently grant access to sensitive resources.

To protect those resources, there is a need to provide a Java security model with support for explicitly denied permissions that may be consulted and honored before granted permissions.

BRIEF SUMMARY OF THE INVENTION

The present invention is an architecture for extending the Java security model to allow a user or administrator to deny permissions explicitly. According to the present invention, a user may define denied permissions both statically, e.g., in a policy file, and/or at runtime, e.g., via a user dialog box. In addition, the user may write dynamically defined denied permissions back to persistent policy files to enable the denied permission to exist across browser sessions.

In a preferred embodiment, the denied permission support is provided by modifying a ProtectionDomain class to include a private permissions attribute containing all permissions explicitly denied to a class, and to include several new methods: a first method to add a permission to the set of denied permissions, a second method to remove a permission from the set of denied permissions, and a third method to check for the presence of a specific permission in the set of denied permissions. In operation, an existing check permission method is modified so that at each call, the denied permissions attribute of each ProtectionDomain is checked before the granted permissions in that ProtectionDomain. If the requested permission is found in the set of denied permissions, the access is denied and a security exception is thrown. If the requested permission is not found in the denied permissions set, the existing check permission logic is followed.

In addition, the denied permissions support includes a modified policy class for reading denied permissions from a policy file. Also, subclasses of this class are modified to include a method to write any dynamic denied permissions back to policy files on disk.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
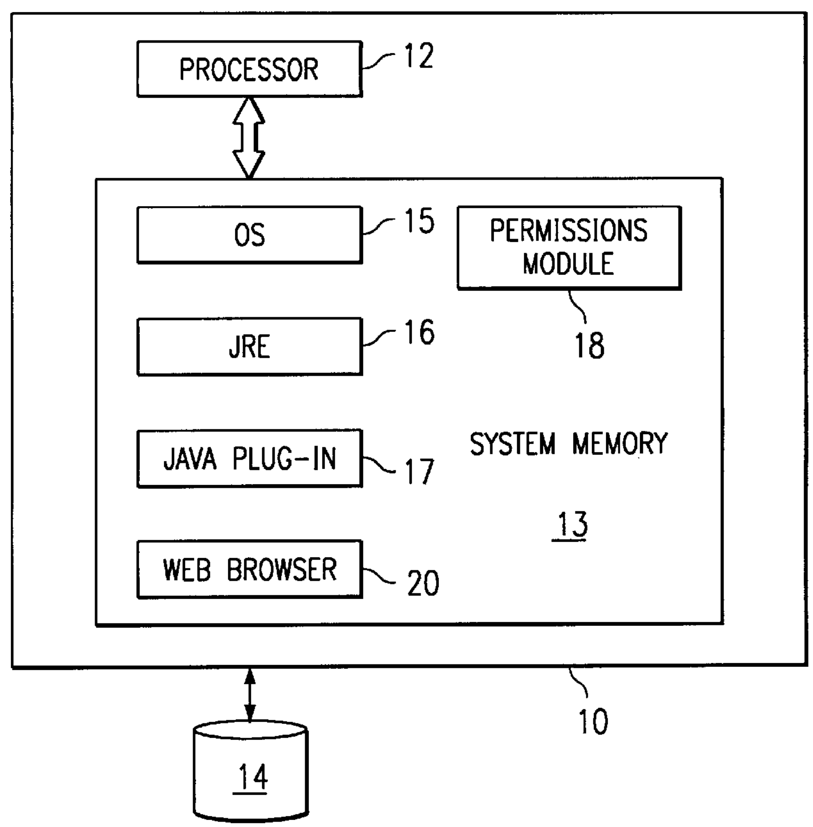
FIG. 1 illustrates a computer in which the inventive architecture is supported.

As will be described below, one or more of the processes that comprise the present invention may be carried out on a computer, or on one or more computers connected via a computer network. Referring to FIG. 1, a computer for use in implementing the present invention is shown. The computer 10 has a processor 12, system memory 13, permanent memory 14, an operating system 15, a Java Runtime Environment ("JRE") 16, an optional Java plug-in 17, a permissions module 18, and a browser 20 that supports the Java plug-in 17. A representative computer is any personal computer or workstation platform that is Intel-, PowerPC®- or RISC®-based, and that includes an operating system such as Microsoft Windows NT with Service Pack 4 installed, JRE Java 2 with the Java plug-in for Java 2 installed, and a browser that supports the Java plug-in, such as Netscape Communicator 4.06.

To implement the present invention, a Java Runtime Environment (JRE) is installed that supports dynamic and denied permissions via the permissions module 18. One or more policy configuration files are installed that list the granted or denied permissions. In addition, Java properties are defined so that the JRE knows to read the aforementioned policy configuration files. Optionally, as will be seen, Java properties are defined so that the user is prompted at runtime whether or not to grant a permission or to deny a non-granted permission. Moreover, Java properties may also defined so that any permissions granted or denied at runtime will be written out to a policy configuration file.

Figure 2:
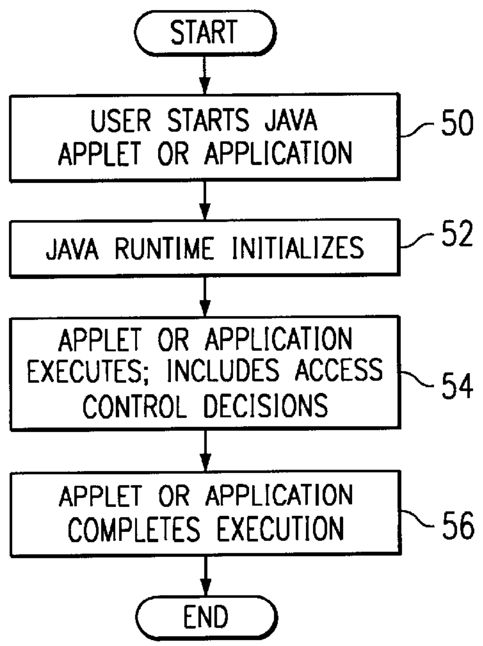
FIG. 2 is a high level flowchart illustrating the operating environment in which the present invention is implemented.

FIG. 2 is a high level flowchart illustrating the operating environment in which the present invention is implemented. By way of brief background, the inventive dynamic and denied permissions support preferably is built into a Java Virtual Machine (JVM) by modifying and enhancing core JRE classes, as will be described in more detail below. These changes make the novel permissions support provided by the permissions module 18 available to both Java applets running in browsers and Java applications running in the Java interpreter. As seen in the flowchart, the routine begins at step 50 when the user starts a Java applet or application. At step 52, the Java Runtime Environment (JRE) initializes. In particular, when a JVM is created (as a result of the Web browser loading a Java applet or the invocation of the Java interpreter), the JRE is initialized. In Java 2, one aspect of initialization is creation of the JVM Policy object. Creation of the Policy object is implementation-dependent; in the reference implementation, and in the preferred embodiment of the invention, the Policy object is created through the JavaSoft PolicyFile class. On initialization, PolicyFile reads permission information stored in static policy files in the system's filesystem. Standard Java implementations support policy files containing permissions to be granted to requesters. As will be seen, the present invention enhances that behavior to include policy files containing permissions to be granted dynamically and/or denied. Therefore, both granted and denied permissions are stored in the PolicyFile. It should be noted that the concept of storing dynamic and/or denied permissions and having them incorporated into the Policy on initialization is applicable to other implementations. For example, the permissions could be stored in a database.

An operation tied closed to the Policy initialization is the association of a ProtectionDomain to each class that is loaded. A ProtectionDomain is a class that couples a CodeSource with a set of permissions granted to that CodeSource. Each class maps to a single CodeSource; thus, a CodeSource may be thought of as a class's identity. Many classes may be loaded from a single CodeSource. A ProtectionDomain maps a CodeSource to its permissions. As will be seen, the present invention enhances this concept in that the permissions that are denied to the CodeSource are also included in the ProtectionDomain; therefore, in the preferred embodiment, a ProtectionDomain defines the permissions both granted to and denied a given class.

Returning to FIG. 2, the routine continues at step 54 with the execution of the Java applet or application. In the course of applet or application execution, it is likely that protected resources will be required (for example, a file may need to be read or written, or a socket may need to be opened). Each time a protected resource is accessed, an access control check is performed. The logic of the access control check is diagrammed separately below.

At step 56, the Java applet or application completes its execution. At this point, the JRE terminates. If the system is configured to do so, the PolicyFile (which has the set of dynamic or denied permissions) may write any permissions marked as "permanent" back to a specified file on the system's filesystem.

Figure 3:
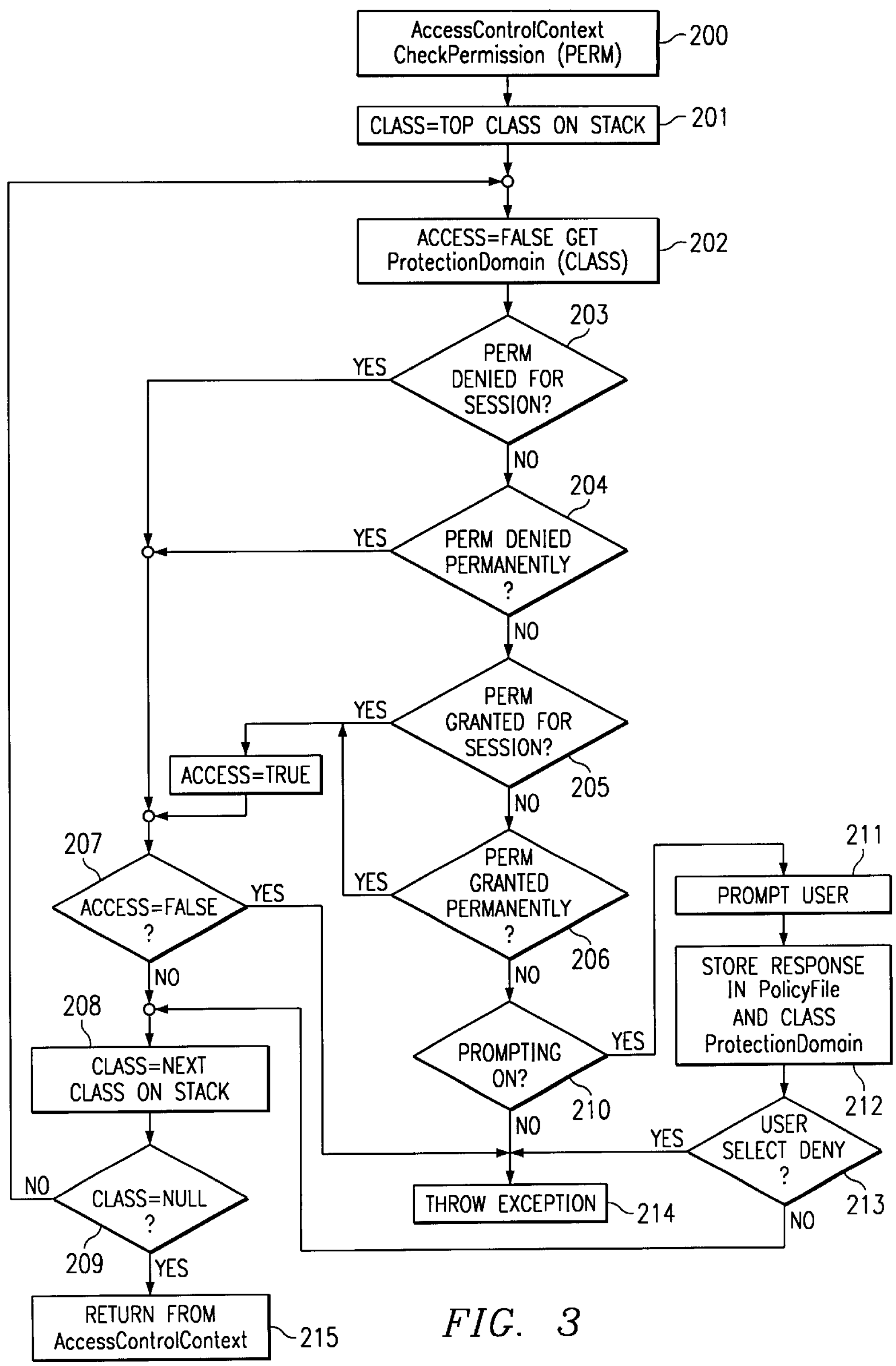
FIG. 3 is a detailed flowchart illustrating the logic flow of an access control decision according to the present invention.

FIG. 3 is a flowchart of the logic flow of an access control decision that may occur during execution of a Java applet or application. In general, the outcome of such a decision will either occur by the throwing of an AccessControlException, meaning that access is denied, or a quiet return from the deciding class, meaning that access is granted. How an AccessControlException is handled is application specific.

The first class of interest in an access control decision is AccessControlContext. The routine begins at step 200 wherein the checkpermission method of this class is invoked with the requested permission as an argument. As is known in the art, access control decisions are made based on all classes on the current execution stack. Thus, AccessControlContext examines the permissions of the classes one by one, starting at step 201 with the class on the top of the stack. Thus, at step 202, it is assumed that the class does not have permission. At this step, AccessControlContext also retrieves the ProtectionDomain associated with the class. The ProtectionDomain embodies all of the class's granted and denied permissions. A private data attribute of ProtectionDomain, of class type ConvergenceProtectionDomain, is the actual container for the permissions. For each ProtectionDomain, this private data member must be obtained via native methods to examine the permissions. A first check is made at step 203 to see if the requested permission is included in the collection of permissions that have been denied for the session. This collection will be non-empty only if the system has been configured for dynamic prompting of permissions granting/denial and the user has chosen to deny one or more permissions for the session for this CodeSource. If the requested permission is found in this collection, no more checks are made.

The next check is made at step 204 to see if the requested permission is included in the collection of permissions that have been denied permanently. This collection will be non-empty if the system has one or more static policy files of denied permissions that were read in on JRE initialization, or if the system has been configured for dynamic permission prompting and the user has chosen to deny one or more permissions permanently for this CodeSource. If the requested permission is found in this collection, no more checks are made.

The next check is made at step 205 to see if the requested permission is included in the collection of permissions that have been granted for the session. This collection will be non-empty only if the system has been configured for dynamic prompting of permission granting/denial and the user has chosen to grant one or more permissions for the session for this CodeSource. If the requested permission is found in this collection, access is set to true and no more checks are made.

The final check is made at step 206 to see if the requested permission is included in the collection of permissions that have been granted permanently. This collection will be non-empty if the system has one or more static policy files of granted permissions that were read in on JRE initialization, or if the system has been configured for dynamic permission prompting and the user has chosen to grant one or more permissions permanently for this CodeSource. Note that the standard Java 2 installation always includes a policy file with a set of default granted permissions. If the requested permission is found in this collection, access is set to true. If the requested permission is not found in this collection, the routine continues at step 210 to test whether prompting is configured on the system. If the outcome of the test at step 210 is negative, an exception is thrown back to the caller at step 214.

After the necessary checks are made, the access boolean is checked again. This is step 207. If access is false (either because the permission has been explicitly denied or the permission has been neither denied nor granted), then the AccessControlContext.checkPermission method throws an exception back to the caller at step 214.

Figure 4:
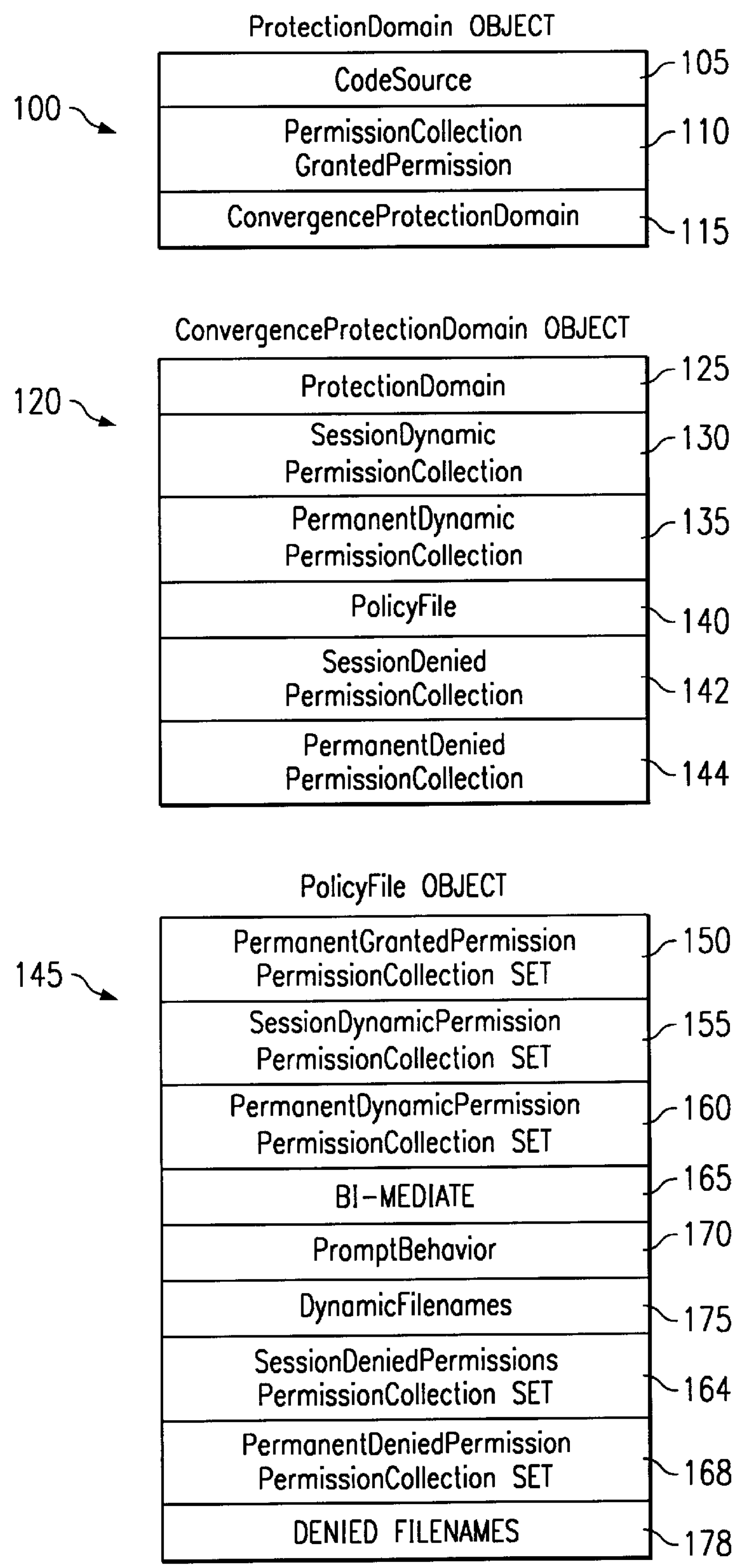
FIG. 4 shows representative data structures used in the inventive architecture.

If access is true (because the permission is granted for this class), then the routine continues at step 208 to retrieve the next class on the stack. At step 209, a test is performed to determine whether there are any more classes on the stack to examine. If so, control returns to step 202. If, however, the outcome of the test at step 209 is positive, then the AccessControlContext.checkPermission method returns quietly to the caller and access is granted at step 215. If the requested permission is not found in any of the denied and granted permission collections for the class, the AccessControlContext.checkPermission determines if the system has been configured for dynamic permission prompting at step 210. If not, the AccessControlContext.checkPermission method throws an exception back to the caller, which is step 214. If prompting is configured, the user is prompted at step 211 to grant or deny the permission, for the session or permanently. Once the user has entered his choice, the permission is stored in the proper permission collection (session granted, permanent granted, session denied, permanent denied) in both the PolicyFile object and the ConvergenceProtectionDomain for this class. This is step 212. After the user has made his choice, AccessControlContext.checkPermission determines if the user has granted or denied the permission. This is step 213. If the user has denied the permission, an exception is thrown back to the caller at step 214. If the user has granted the permission, the permission may be saved for the session or permanently as specified by the user's input at the prompt dialog. The next class on the stack is retrieved at step 208. This completes the processing. FIG. 4 shows representative data structures used in the inventive architecture. As noted above, the ProtectionDomain class 100 exists in Java 2 and contains a CodeSource cs 105 and PermissionCollection grantedpermission 110. Each class, except for core and trusted classes, is associated with a ProtectionDomain object. The CodeSource indicates where the class was loaded from, and the grantedpermission PermissionCollection indicates the granted static permissions of the class. The inventive architecture adds a ConvergenceProtectionDomain cpd object 115 to the set of ProtectionDomain attributes. The cpd is a pointer to a ConvergenceProtectionDomain object. A ConvergenceProtectionDomain class 120 is also added by the invention, and this class contains a ProtectionDomain pd object 125, which is a pointer back to the associated ProtectionDomain object. The ConvergenceProtectionDomain also includes a sessionDynamic object 130 and a permanentDynamic PermissionCollection object 135, as well as a pointer to a PolicyFile pf object 140. A sessionDynamic PermissionCollection attribute indicates dynamic granted permissions that the class belonging to the associated ProtectionDomain pd has while the JRE is running. A permanentDynamic PermissionCollection attribute indicates dynamic granted permissions that the class belonging to the associated ProtectionDomain pd has for all invocations of the JRE. A permanentDynamic PermissionCollection differs from the permanentGranted PermissionCollection because permissions in the permanentGranted PermissionCollection are associated with the static policy files that the user or administrator maintains, while the permanentDynamic PermissionCollection are associated with the dynamic policy files that the JRE maintains. Both indicate granted permissions to the associated class.

Support for denied permissions is provided using a pair of additional attributes: a sessionDenied PermissionCollection attribute 142 and a permanentDenied PermissionCollection attribute 144.

The JavaSoft PolicyFile object 145 is a subclass of the Policy object, and both of these objects exist in Java 2 to serve as a repository for all loaded permissions. The PolicyFile is the default storage location for the granted permission, but other mediums can be used as well. The permanentGrantedPermissions PermissionCollection set 150 already exists as an attribute with this object. The inventive architecture adds a sessionDynamicPermissions set 155 and a permanentDynamicPermissions PermissionCollection set 160 as attributes to store the set or collection of dynamic permissions that are granted for just the JRE session or permanently, as the case may be. For denied permissions support, the architecture adds a sessionDeniedPermissions PermissionCollection set 164 and a permanentDeniedPermission PermissionCollection set attribute 168. The inventive architecture further includes a boolean bimmediate flag 165 that indicates whether or not permanentDynamicPermissions should be saved to their corresponding file immediately or when the Java applet or program is destroyed. A promptBehavior 170 attribute indicates if the JRE should perform its normal Java 2 behavior, prompt if a permission has not been granted, accept a permission that has not been granted as granted for the session, or accept a permission that has not been granted as granted permanently. A dynamicfilenames attribute 175 is used to indicate the one or more URLs to the dynamic files. A denied Filenames attribute 178 is used to indicate one or more URLs to the denied files.

The table data structures described herein may be implemented in various ways including, for example, arrays, hash tables and linked lists.

Figure 5:
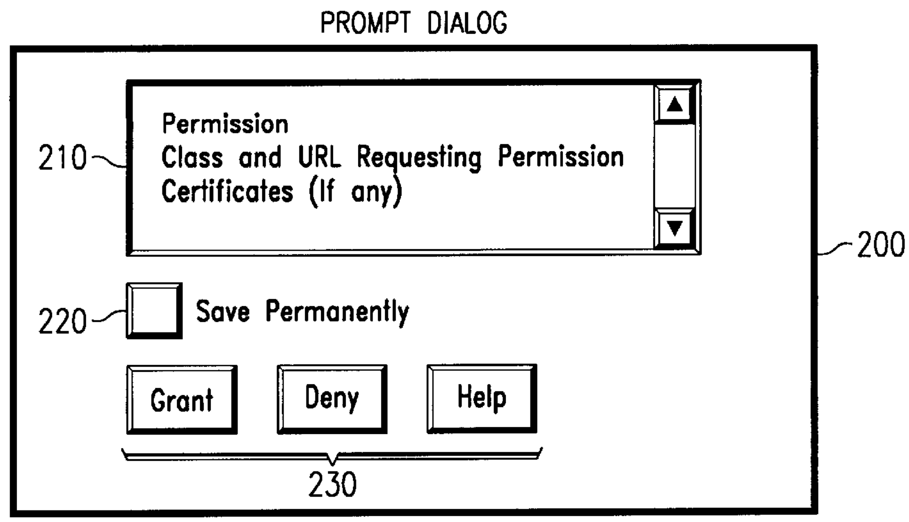
FIG. 5 shows a permission prompt dialog according to the present invention.

FIG. 5 shows a permission prompt dialog 200 according to the present invention. The JRE displays this dialog when the promptBehavior attribute is set to prompt and when the JRE does not find the permission in the class's associated permanentGranted, sessionDenied, permanentDenied, sessionDynamic, or permanentDynamic PermissionCollections. The text area 210 shows the permission the user is prompted with along with the class that is asking for the permission and the URL from where the class was loaded. Preferably, any certificates the class was signed with are also shown in this text area. A Save Permanently checkbox 220 allows the user to indicate that if the permission is granted, it should be dynamically granted just for the session or, in the alternative, permanently. A dialog buttons 230 allow the user to grant, to deny, or to get more help text with respect to the prompted permission.

Figure 6:
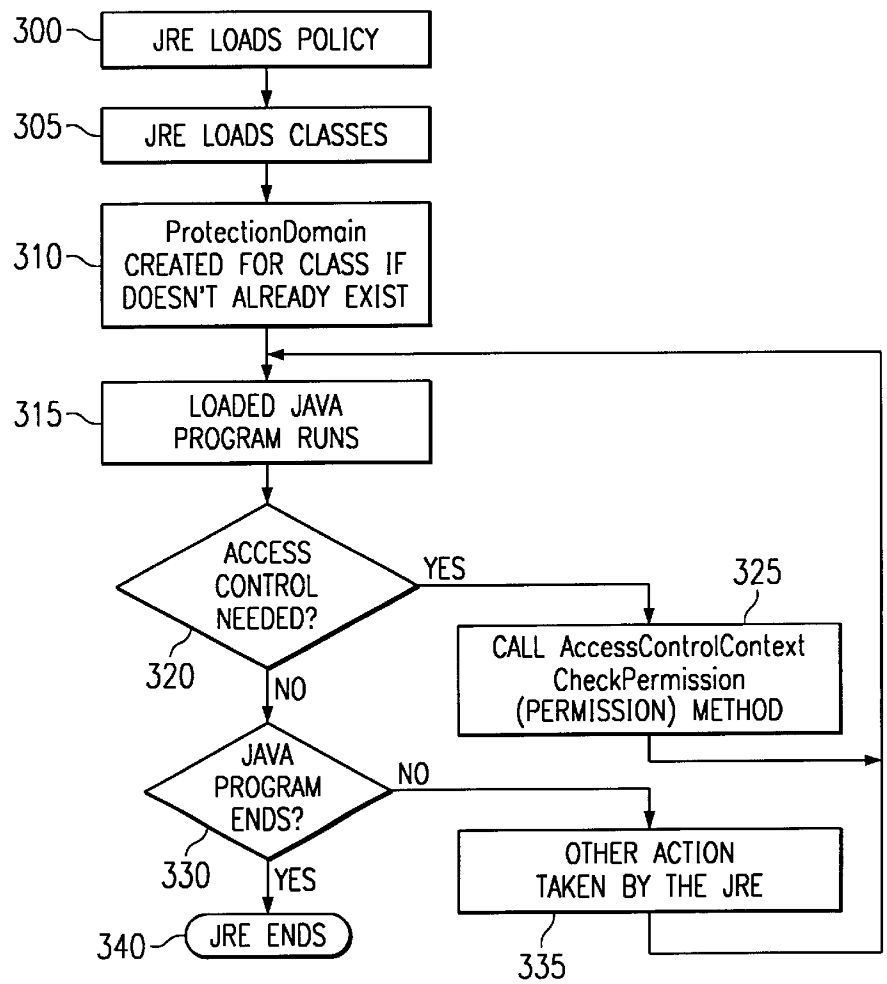
FIG. 6 illustrates a Java Program process flow.

The flowcharts of FIGS. 2–3 have described the operation of the present invention at a fairly high level. For completeness, the flowcharts of FIGS. 6–8 are now provided and described to illustrate the operation of the novel permissions architecture in more detail.

FIG. 6 again illustrates the Java program process flow. As noted above, Java programs typically comprise applets or applications. The Java Runtime Environment (JRE) first loads the policy from the policy files 300 before it loads the classes for the program 305. Next, the JRE creates a ProtectionDomain object for each class if the class is not a core or trusted class and if the ProtectionDomain object does not already exist. The loaded Java program then runs at 315. If access control is needed as indicated by step 320, the JRE calls the checkpermission method on the AccessControlContext object at step 325, passing in the desired permission. The method returns normally if the permission was granted; otherwise, it throws an exception. In either case, flow returns to step 315. If, however, access control is not needed at step 320, the JRE checks if the Java program has ended. This is step 330. If the Java program has not ended, the JRE performs the indicated action at step 335 and then returns to step 315. If the Java program has ended as indicated in step 330, the JRE ends at step 340.

The inventive architecture augments the loading of the policy at step 300 and the checking for permissions at step 325. These functions are now described in the flowcharts of FIGS. 7–8.

Figure 7:
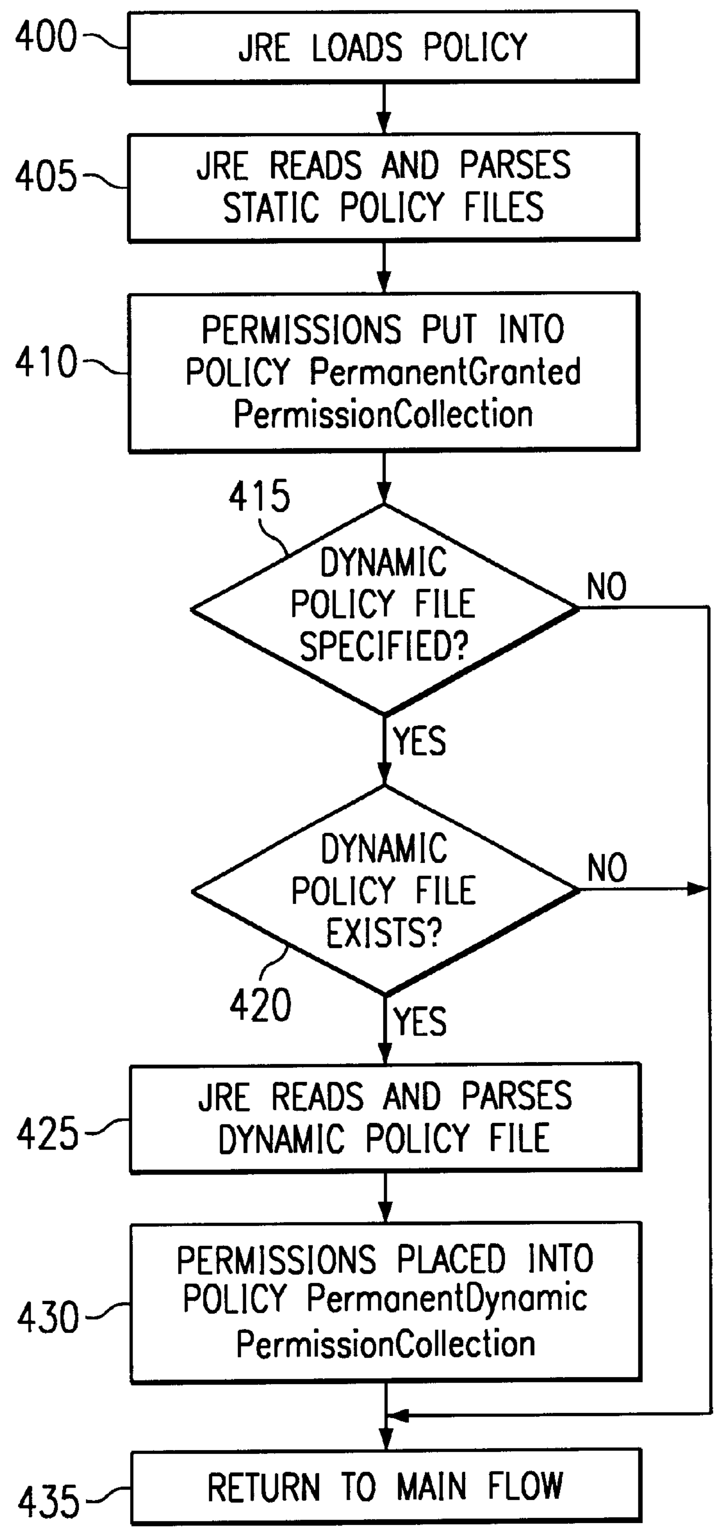
FIG. 7 illustrates a JRE Load Policy process flow according to the present invention.
Figure 8:
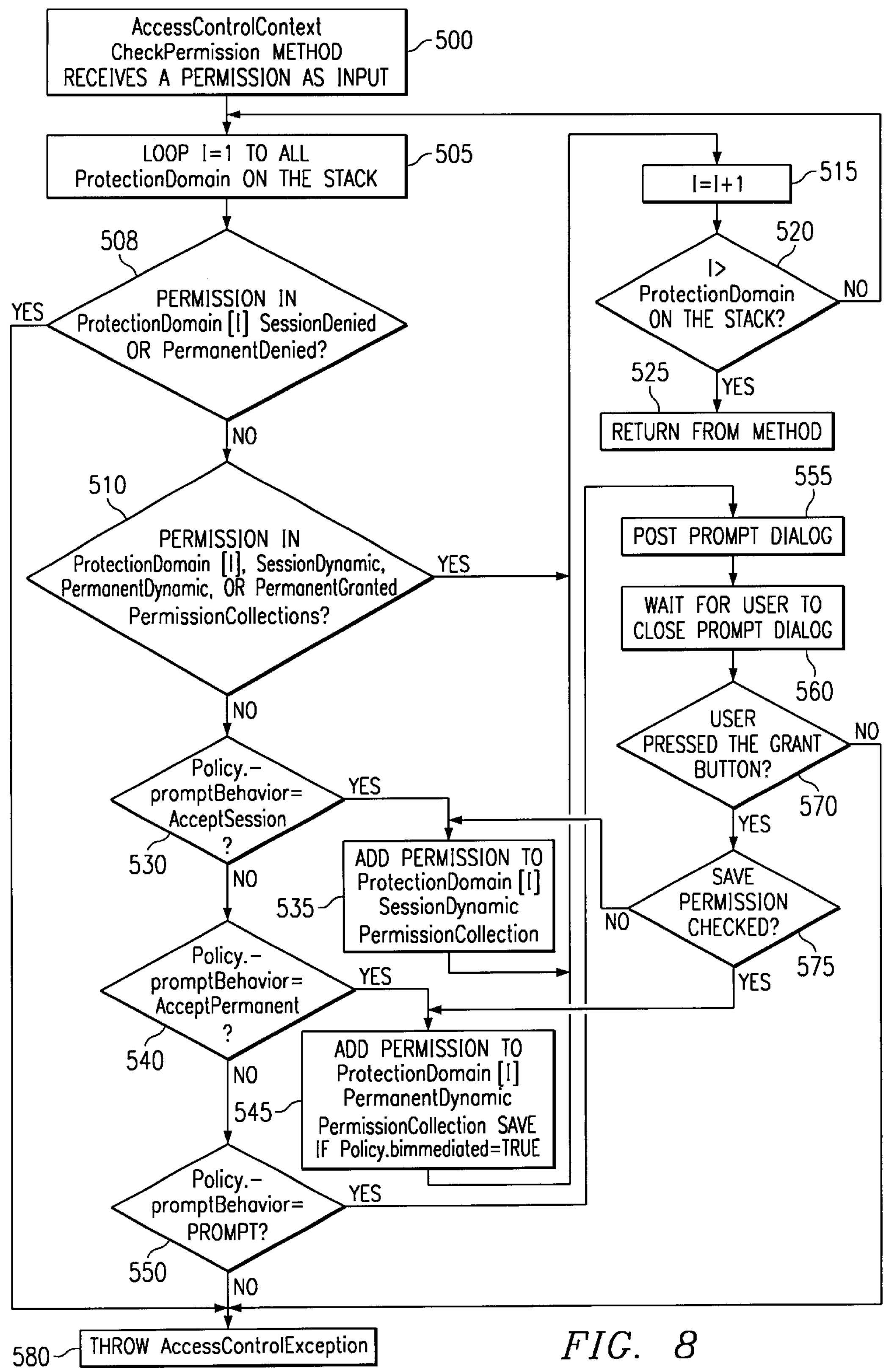
FIG. 8 is a checkPermission method flow for the AccessControlContext class according to the invention.

FIG. 7 illustrates the JRE Load Policy flow beginning at step 400. Next, at step 405, the JRE reads and parses the static policy files. The loaded permissions are stored in the permanentGranted PermissionCollection set at step 410. Flow continues to step 415 where the JRE checks if one or more dynamic policy files were specified. If not, flow continues to step 435. If step 415 resolves affirmatively, flow continues to step 420 where the JRE checks if the specified dynamic policy files exist. If not, flow continues to step 435. If step 420 resolves affirmatively, flow continues at step 425 where the JRE reads and parses the dynamic policy files. The loaded permissions are then stored in the permanentDynamic PermissionCollection set at step 430. Flow then continues to step 435 where the load policy flow returns to the main processing thread.

For denied permissions, a process flow similar to steps 415 through 430 is used to support the JRE Load policy flow supporting denied policy files.

FIG. 8 is a checkPermission method flow for the AccessControlContext class. The flow starts at step 500 where the checkpermission method on the AccessControlContext object is called by another method in the JRE that needs to know whether or not a permission has been granted. The checkpermission method receives a permission object as input. Flow then continues at step 505 where the JRE starts a loop beginning at I equal to 1 to all ProtectionDomain objects on the execution stack. Each method on the stack has a class that in turn has a ProtectionDomain. The ProtectionDomain objects are assembled into a ProtectionDomain[0 ] array. Flow continues at step 508. At this step, a test is performed to determine if the permission exists in the ProtectionDomain[I] SessionDenied or PermanentDenied Permission Collections. If so, the routine branches to step 580. If the outcome of the test at step 508 is negative, control continues at 510 where the JRE checks for the permission object in the permanentGranted, sessionDynamic, or permanentDynamic PermissionCollections associated with ProtectionDomain[I]. If the object exists, processing continues at step 515 where index I is incremented by 1. If the object does not exist, processing continues at step 530 where the JRE checks if the Policy.promptBehavior attribute value is equal to acceptSession. If not, processing continues at step 540. If step 530 resolves in the affirmative, processing continues at step 535 where the permission is added to the sessionDynamic PermissionCollection for the PolicyFile object and the ConvergenceProtectionDomain object associated with ProtectionDomain[I]. Flow then continues at step 515.

For denied permission support, the routine includes a process flow similar to steps 530 and 535 for the denysession behavior. Moreover, the routine includes a process flow similar to steps 540 and 545 for the denyPermanant behavior.

At step 540, the JRE checks if the Policy.promptBehavior attribute value is equal to acceptPermanent. If not, processing continues at step 550. If step 540 resolves in the affirmative, processing continues at step 545 where the permission is added to the permanentDynamic PermissionCollection for the PolicyFile object and the ConvergenceProtectionDomain object associated with ProtectionDomain[I]. If the Policy.bimmediate flag is true, the JRE also stores the permission to the corresponding dynamic policy file. Flow then continues at step 515. At step 550, the JRE checks if the Policy.promptBehavior attribute value is equal to prompt. If not, processing continues at step 580 where the JRE throws an AccessControlException to the calling method to indicate that the permission was not granted. If step 550 resolves positively, the JRE posts the prompt permission dialog at step 555 and waits for the user to close the prompt dialog in step 560 (e.g., by pressing the Grant or Deny button on the dialog). Next, at step 570, the JRE checks if the user selected the Grant button. If not, flow continues at step 580. If the user selected the Grant button, the flow continues at step 575 where the JRE checks if the Save Permission checkbox was checked. If so, flow continues at step 545. If the Save Permission checkbox was checked, flow continues at step 535.

For denied permissions support, if the user selected the Deny button at step 570, the permission would be processed in a manner similar to that of steps 535 and 545, depending on whether the save permission checkbox was selected. The deny permission versions of steps 535 and 545, however, resolve to step 580 where the method throws an exception.

At step 515, the JRE continues at step 520 where it checks if index I is greater than the number of ProtectionDomain objects on the stack. If not, flow continues to step 505. If step 515 resolves in the affirmative, flow continues at step 525 where the checkpermission method returns to the caller without throwing an exception. In conventional Java 2 processing, the method would throw an AccessControlException if the permission was not in the permanentGranted PermissionCollection. This completes the processing.

Java Security Properties

To provide users with a level of control over how their dynamic and denied permissions behave, the present invention introduces the following Java Security configuration properties:

java.dynamic.behavior—specifies which action to take if a permission has not been granted or denied.

java.dynamic.save—indicates when to save permanent dynamic or denied permissions.

dynamic.policy.url—file name to store the permanent dynamic permissions.

denied.policy.url—file name to store the permanent denied permissions.

As noted above, the inventive framework prompts or does not prompt the user based on the value of the java.dynamic.behavior Java security property. The default value is to not prompt the user and assume that the permission is not granted. The default behavior mimics the Java 2 permission model where permissions that have not been explicitly granted are denied. Other possible values indicate if the user should be prompted or if a permission should automatically be granted or denied for the session or permanently.

The java.dynamic.save property indicates when the permanent dynamic or denied permissions will be saved, either immediately or when the applet is destroyed or disposed. The dynamic.policy.url and denied.policy.url properties indicate the location of the respective dynamic and denied policy files. In a preferred embodiment, the invention extends the implementation of Ad the default PolicyFile object and supports one permanent dynamic policy file and one permanent denied policy file. The number of supported dynamic and denied policy files may be scaleable to support multiple files in the same fashion as Java 2 supports multiple Java policy files for static granted permissions.

The present invention thus makes enhancements to core Java classes and methods to allow the security model to support static and dynamic permissions. The following description provides further details of the changes implemented by the present invention.

Security Behavior Property

Java security properties are defined in the java.security file. The inventive architecture adds the java.dynamic.behavior property to allow users and administrators to customize the dynamic prompting, granting, or denying behavior.

java.dynamic.behavior—None, Prompt, AcceptSession, AcceptPermanent, DenySession, DenyPermanent The default is None, which is equivalent to the current behavior in Java 2.

Prompt indicates that if a permission has not already been granted, whether static or dynamic, and is not denied, the user should be prompted if the checked permission should be granted or denied for the CodeSource. The prompted permission's attributes will be set according to user specifications during runtime.

AcceptSession indicates that the user should not be prompted. Permissions that have not been statically or dynamically granted and have not been denied will be granted while the JRE is running for the Java program session.

AcceptPermanent indicates that the user should not be prompted. Permissions that have not been statically or dynamically granted and have not been denied will be granted while the JRE is running for the Java program session and saved for future invocations of the JRE.

DenySession indicates that the user should not be prompted. Permissions that have not been statically or dynamically granted and have not been denied will be denied while the JRE is running for the Java program session.

DenyPermanent indicates that the user should not be prompted. Permissions that have not been statically or dynamically granted and have not been denied will be denied while the JRE is running for the Java program session and saved for future invocations of the JRE.

Checking Permissions

As is also well-known, when Java checks to see if a permission has been granted before performing an action, it goes through the AccessController checkPermission method. In turn, this method calls the AccessControlContext checkpermission method. If a permission has not been denied and was not granted, Java normally throws an AccessControlException. The inventive architecture modifies the checkpermission method in the AccessControlContext object to follow the directives of the Java Security java.dynamic.behavior attribute.

The checkpermission method queries the ProtectionDomains belonging to the classes on the stack, starting with the topmost one. If a permission has not already been granted or denied for the CodeSource related to the indexed class on the stack, Java automatically grants the permission, denies the permission, or prompts the user regarding whether the permission should be granted or denied depending on the value of the Java Security java.dynamic.behavior attribute. If the java.dynamic.behavior attribute was set to None, the method throws an AccessControlException as with the unmodified behavior of the method.

If the permission was granted or denied, the method updates the corresponding ConvergenceProtectionDomain PermissionCollection that is part of the ProtectionDomain object belonging to the class on the stack. After the granted or denied PermissionCollection is updated, Java refreshes the policy for the CodeSource and updates the class's ProtectionDomain accordingly. If the permission was denied, the method ends processing by throwing an AccessControlException. Otherwise, the method continues checking the ProtectionDomains for the remaining classes on the stack.

The method checks permissions in each ProtectionDomain object for all classes on the stack. Alternatively, the Java doprivileged method allows programs to limit the level of the stack checked. Thus, the user may be prompted to grant the same permission on more than one CodeSource. The permission must be granted for all CodeSources on the stack for the checkPermission method to succeed. For example, if the user dynamically grants permission for three out of four classes on the stack, but denies the fourth, the checkpermission method throws an AccessControlException.

Prompt Dialog

If the Java Security java.dynamic.behavior value is set to Prompt, whether or not the Java program is a graphical applet or application or a command line application, Java will query the user whether a permission should be granted or denied.

The prompt dialog includes the following information:

Type and value of the Permission

Class and CodeSource, comprising of the URL, and certificates (if any)

Save checkbox

Help information related to the permission

Grant button

Deny button

The Save checkbox or question indicates whether or not the dynamic permission should be saved as a granted or denied permission. If not selected, the dynamic permission will not be remembered past the current JRE session. The Grant and Deny buttons grant or deny the specified permission for the referenced CodeSource. If the user is operating in a graphical environment, the prompt will be in the form of a dialog box. If the user is in a command line environment, the prompt could take the form of questions corresponding to the checkbox and button controls. In graphical mode, the prompt dialog preferably also includes a View Permissions button that when pressed, allows the user to view all the granted and denied permissions related to the CodeSource in a graphical table format. This information can assist the user make an informed choice in granting or denying the permission and assists developers debug their Java programs.

Saving Dynamic Permissions

When the user or Java program exits the JRE, Java searches the existing ProtectionDomain objects. If it finds any Permissions that have not already been saved, Java writes granted permissions in the dynamic.policy.url file and denied permissions in the denied.policy.url file. If the location of the files was not specified in the Java Security file, Java will add entries for the files in the java.security file and store the physical files in a given (e.g., $(user.home)) directory.

The policy file design reflects the default backing store provided by Java. Other permanent repositories of granted and denied permissions could be implemented as well. When the JRE starts, it reads in the specified dynamic.policy.url and denied.policy.url files and uses them when constructing the policies and ProtectionDomains for the loaded classes.

Enhancements

A further enhancement would be for Java to combine redundant permissions that may exist for the same CodeSource in multiple files. This should be a customizable feature because users or administrators may not want the contents of their policy files to automatically change. Having redundant permissions causes no ill effects in Java because the evaluated policy for a CodeSource will be derived at runtime. Java combines duplicate permissions as needed.

Another enhancement is to support a PromptAlways Java Security java.dynamic.behavior attribute value. If this value is set, Java ignores the contents of all Java policy files and thus prompt the user to grant or deny a permission needed while the Java program is running. This feature would be useful for users and administrators to see what permissions are required for a Java program or a particular function in a Java program. PromptAlwaysSession and PromptAlwaysPermanent permutations are further derivations.

Alternatively, dynamic permissions are written by a separate Java thread at periodic intervals or immediately when the permission was granted or denied during runtime. The write operation affects performance somewhere during the life of the JRE. It all depends whether this takes place as the Java program is running or when it completes.

Although designed for the security model in Java 2, the invention may apply to any security architecture where dynamic permissions or privileges are needed in the applet or application environment.

Denied Permissions Support

The classes below describe a preferred implementation of the denied permission support. This support adds two new classes, modifies two standard JRE classes and modifies one non-standard JRE class. Preferably, the architecture maintains the published standard interfaces of the standard Java classes. Thus, preferably no new non-private attributes or methods are added to the standard classes.

com.ibm.convergence.ConvergenceManager

This is a new class implemented especially for the inventive architecture. It contains many fields used to identify collections of permissions as granted or denied and as session or permanent in duration. The class also has public methods to programmatically grant, deny or revert permissions. "Reverting" a permission means to remove it from any session collection (both denied and granted session permission collections) for the ProtectionDomain of the calling class.

New Methods:

public static void denypermission

Adds the specified permission to the session denied collection of permissions of the ProtectionDomain for the calling class. Calls ConvergenceProtectionDomain.addPermission and uses native methods to add the denied permission to the PolicyFile collection of denied permissions.

public static void removePermission

Removes the specified permission from all session permission collections of the ProtectionDomain for the calling class. Calls ConvergenceProtectionDomain.removePermission.

com.ibm.convergence.ConverQenceProtectionDomain

This is a new class implemented especially for the inventive architecture. An instance of a ConvergenceProtectionDomain is included as a private attribute of each ProtectionDomain and serves to hold architecture-specific data and methods, including denied permissions. Java implementations that are not JCK-compliant ("100% Pure Java") can modify the ProtectionDomain class itself adding the necessary non-private attributes and methods.

The attributes and methods in direct support of denied permissions are listed below.

New Attributes:

private PermissionCollection deniedpermissions

A collection of permissions that have been denied for this session of the JRE only. This collection is created at runtime as a result of a user selecting "deny" when prompted to grant a permission, or if the java.dynamic.behavior property has been set to automatically deny (for the session) any permission that is not already granted.

private PermissionCollection—permanentDeniedPermissions

A collection of permissions that have been denied for every session of the JRE. This collection can be created from information read in from static policy configuration files. It can also be created or added to at runtime as a result of a user selecting "deny permanently" when prompted to grant a permission, or if the java.dynamic.behavior property has been set to automatically permanently deny any permission that is not already granted.

Note that if runtime permission prompting ("dynamic permissions") are not supported, this collection can still be created from static policy files. The denied permissions for subsequent JRE sessions may change by changing the contents of the policy files.

New Methods:

public boolean checkPermission ( )

Checks if a specified permission is in a specified permission collection. Returns true if so, false otherwise. This method is called by the standard JDK AccessController.checkPermission ( ) method during resource access checks.

public void addpermission ( )

Adds a permission to a specified permission collection. Called by the ConvergenceManager class.

public void removePermission ( )

Removes a permission from a specified permission collection. Called by the ConvergenceManager class.

java.security.AccessControlContext

This is a standard JRE class that implements the access control logic via its checkpermission method. When checkpermission is called:

AccessControlContext examines every class on the stack, getting the class's ProtectionDomain and determining if the requested permission is granted to that ProtectionDomain. If any class fails the test, an AccessControlException is thrown and access is denied.

Modified Methods:

public void checkpermission ( )

Modified to use native methods to get the ConvergenceProtectionDomain associated with the ProtectionDomain of the class being examined. The ConvergenceProtectionDomain is consulted to see if the permission being requested has been denied (either for the session or permanently). If so, an AccessControlException is thrown. If not, the ProtectionDomain is consulted to see if the permission has been granted. If so, the next class on the stack is examined. If not, the user may be prompted to grant or deny the permission (if the system is configured to do so) or an exception may be thrown.

In the preferred embodiment, denied permissions are always checked before granted permissions. This allows users easy access to a large group of related resources, while excluding access to one or a small subset of the resources.

java.security.ProtectionDomain

This standard Java class maps a class to its associated set of permissions. In standard Java, these permissions are all statically granted via policy configuration files. This class has been augmented to include a private attribute, of type ConvergenceProtectionDomain, to hold various types of permissions: permanent granted (from configuration files), session granted (from runtime prompting), permanent denied (from configuration files), session denied (from runtime prompting). During access control checks, the various permission "buckets" of the embedded ConvergenceProtectionDomain are examined.

To adhere to the JCK, no new non-private attributes or methods were added to this standard Java class. Note, however, that the present invention can be generalized to implementations that modify the ProtectionDomain class in other ways (by adding non-private attributes, for example).

New Attributes:

private ConvergenceProtectionDomain convergencePd

Holds statically and dynamically granted and denied permissions and contains methods to access those categories of permissions.

Modified Methods:

public boolean implies ( )

The logic of this method was changed to check if the specified permission is denied by the denied permissions associated with this ProtectionDomain (via the covergencePD attribute). If the permission is implied by the denied permissions, then this method returns false, because a permission cannot be implied if it is denied.

The present invention provides numerous advantages over the prior art. With the inventive architecture, Java applet and application developers are able to give more flexibility to their end users.

EXAMPLE

The following example illustrates the dynamic and denied permission features provided by the present invention. For illustrative purposes, the example is a simple applet that attempts to read a local file and display its contents. The source code for this applet is shown below:

```
import java.applet.Applet;
import java.awt.*;
import java.io.*;
public class FileReaderApplet extends Applet {
    protected final TextArea textArea = new
TextArea ( );
    String filename = "c:/temp/test.txt";
    String line;
    public void init( ) {
        try {
                super.init( );
                setSize (500, 300);
                setLayout (new BorderLayout ( ));
                add (textArea, BorderLayout.CENTER);
                line = "This test applet attempts to
read a
                file.";
                textArea.append (line);
                line = "Trying to read" + filename;
                textArea.append ("\n"+line);
                line = "Contents of " + filename +
":";
                textArea.append ("\n"+line);
                File f = new File(filename);
                FileReader fr = new FileReader(f);
                BufferedReader br = new
BufferedReader (fr);
                line = br.readLine( );
                while(line !=null) {
                        textArea.append("\n"+line);
                        line = br.readLine( );
                }
                line = "EOF";
                textArea.append ("\n"+line);
        } catch (Exception e) {
                e.printStackTrace( );
                line = "Exception: " + e.toString( );
                textArea.append("\n"=line);
        }
    }
}
```

The applet class file, FileReaderApplet.class, can be placed in a convenient test directory on the local or remote machine. Assume for the following scenarios that the class file is placed in the local directory e:\tests.

The following HTML file is used to load the applet into a Web browser. It should be located in the same directory as the applet class. This HTML file has been generated by JavaSoft's HTML converter and contains tags (OBJECT for Internet Explorer, EMBED for Netscape Navigator) that indicate to the browser that the applet is to be run in the environment specified by the Java Plugin and not in the browser's native Java environment. For this example, the Java Plugin is configured to run the Java 2 JRE.

```
<HTML>
<TITLE>Java Convergence Test of Denied and Dynamic
Permissions</TITLE>
<H2>Test applet tries to read a local file</H2>
<BODY>
<!"CONVERTED_APPLET">
<!CONVERTER VERSION 1.0 >
<OBJECT classid="clsid::8AD9C840044E11D1B3E9
00805F499D93"
WIDTH = 500 HEIGHT = 500
codebase="http://java.sun.com/products/plugin/1.2/jinstal
1
```

-continued

```
    12
    win32.cab#Version=1, 2, 0, 0">
    <PARAM NAME = CODE VALUE = "FileReaderApplet.class"
>
    <PARAM NAME="type" VALUE="application/xjavaapplet
    ;version=1.2">
    <COMMENT>
    <EMBED type= "application/xjavaapplet ;version=1.2"
    java_CODE =
    "FileReaderApplet.class" WIDTH = 500 HEIGHT = 500
pluginspage="http://java.sun.com/products/plugin/1.2/
    plugin
    install.html"><NOEMBED></COMMENT>
    </NOEMBED></EMBED>
    </OBJECT>
    <!
    <APPLET CODE = "FileReaderApplet.class" WIDTH = 500
    HEIGHT = 500>
    </APPLET>
    >
    <!"END_CONVERTED_APPLET">
    </BODY>
    </HTML>
```

Scenario One: Running in the Default Java 2 Environment

Running the applet in a default Java 2 configuration results in an exception:

This test applet attempts to read a file.

Trying to read c:/temp/test.txt

Contents of c:/temp/test.txt:

Exception: java.security.AccessControlException: access denied (java.io.FilePermission C:\temp\test.txt read)

The exception stack displayed in the Java Plug-in's Java Console shows that this FilePermission is required when the applet attempts to instantiate itsFileRead object. The AccessController.checkPermission method consults the ProtectionDomain of each class on the stack to verify that the permission is granted. The ProtectionDomains are constructed from static policy files present in the system, and by default, they do not contain permissions to access the file system.

The runtime exception is remedied by modifying one of the policy files in effect (as defined by the policy.url.n properties in the java.security file) to grant the needed permission to the test applet's CodeSource. For example, the following stanza is added to the policy file:

```
            grant codeBase "file:e:/tests/" {
                permission java.io.FilePermission
        "c:/temp/test.txt",
                "read";
            };
```

With this policy modification, the applet runs successfully and prints out the contents of c:\temp\test.txt:

This test applet attempts to read a file.

Trying to read c:/temp/test.txt

Contents of c:/temp/test.txt:

Test for Java Convergence.

EOF

At this point, every class file in the e:\tests directory has read access to c:\temp\test.txt file, and that access persists until the policy file is modified to remove the permission. Note that any changes made to the static policy configuration files are not reflected in the JRE unless the internal Policy object is refreshed (programmatically or with a new invocation of the JRE). This typically requires rerunning the applet after changing a policy file.

Scenario Two: Running in an Environment of the Invention

Now consider the scenario in which the system is configured with the default Java 2 policy file but the following Java properties have been added to the java.security file:

java.dynamic.behavior=prompt java.dynamic.save=immediate dynamic.policy.url=${java.home}/lib/security/dynamic.policy denied.policy.url=${java.home}/lib/security/denied.policy The Java Plug-in configuration remains the same except that the new Java classes are specified in the Java Run Time Parameters. When the applet runs and attempts to instantiate a FileReader, the AccessController.checkPermission method detects that the applet's CodeSource has neither been granted nor denied the required FilePermission. Because the java.dynamic.behavior property is set to prompt, the invention posts a dialog asking the user whether to grant or deny this permission, and whether to make that decision permanent or only for the current browser session.

If the user chooses to grant the permission, the applet runs successfully. If the user chooses to deny the permission, the applet throws an AccessControlException as in the prior art. If the user chooses to grant or deny the permission for the current session only, no information is saved to the dynamic or denied policy files, and when the user creates a new web browser session and runs the applet, the inventive architecture prompts the user again. If the user chooses to grant or deny the permission permanently, the architecture saves the decision to the corresponding dynamic or denied policy file. The next time the user runs the applet, the permissions in these files are incorporated into the Java Policy and the AccessController.checkPermission method does not prompt the user. The point at which the dynamically granted or denied permissions are saved (immediately after prompting or at applet disposal) is based on the value of the java.dynamic.save property.

The java.dynamic.behavior property can be set to other values so that nondenied, nongranted permissions can be dynamically granted or denied without runtime intervention from the user.

As this example illustrates, the inventive architecture provides many advantages over the default Java 2 environment including:

Required permissions can be granted at runtime without having to restart the browser and reload the applet.

Permissions that are granted or denied at runtime can be saved automatically in permanent policy files. These permissions then become part of the security policy in future browser sessions.

Extensions

The features introduced and implemented by the present invention can be applied to solve problems or offer additional functionality in other Java environments, such as support for Java applications. Adding the inventive Java support for dynamic and denied permission would provide more control and flexibility to application users.

The present invention provides denied permission support into the base classes of Java 1.2. This support allows any Java executable that uses a Java 1.2-based JVM to benefit Java applications, Java applets running in web browsers using a Java 1.2 JVM as their native JVM (e.g., appletviewer of HotJava), and Java applets running in Internet Explorer or Netscape Communicator with JavaSoft's Java Plug-in configured to use a Java 1.2-based JVM. While described in the context of a Java security model, the denied permissions support of the present invention can be applied to other enterprise capabilities-based security models without departing from the inventive principles.

For an alternative implementation, the Java Permission class could receive the following additional attributes:

boolean dynamic—whether or not the user granted the permission dynamically. The default is false. When the user grants or denies a permission during runtime, the corresponding permission's dynamic attribute is set to true.

int state—unknown, granted or denied. The default is unknown. When Java reads a permission from a policy file or is dynamically granted by the user, the permission state is set to granted. A permission's state may also be set to denied through the same mechanism.

boolean save—whether or not the permission should be saved permanently. The default is false. If the user indicates during runtime that the permission should be saved, the save attribute is set to true.

While the above changes require modifying the Permission class, which is not required in the preferred embodiment, these attributes obviate the different additional permission collections in the ProtectionDomain and ConvergenceProtectionDomain classes. The additional permission collections could still be retained to help in the performance of permission searches, however.

One of the preferred implementations of the invention is as a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the apresent invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having described our invention, what we now claim is set forth below.

What is claimed is:

1. A method for determining access to objects in a Java runtime environment, the method comprising:

responsive to instantiation of a protection domain, reading a policy configuration file having a list of granted and/or denied permissions, retrieving the granted and/or denied permissions, and associating the granted and/or denied permissions with a private attribute of a protection domain class;

defining a second attribute of the protection domain class to identify a permission as a statically or dynamically defined permission;

defining a third attribute of the protection domain class to identify whether to save a dynamically defined permission to the policy configuration file;

operative at an access control point during execution of a Java applet, determining the protection domain of a class being examined;

accessing a private attribute of the associated protection domain class to obtain a permission that is identified by the second attribute of the protection domain class as a statically defined permission;

prompting a user to obtain a permission that is identified by the second attribute of the protection domain class as a dynamically defined permission;

analyzing the obtained permission to determine whether access to a requested object has been denied to the protection domain; and saving a dynamically defined permission into the policy configuration file in accordance with the third attribute of the protection domain class.

2. The method as described in claim 1 wherein the method is practiced in an object-oriented system and the permissions are stored as attributes in a permission class.

3. The method as described in claim 1 further comprising:

throwing an access exception to deny access to a requested object in response to determining that the requested access has been denied.

4. The method as described in claim 1 further comprising:

determining whether the requested permission has been granted in response to determining that the requested access has not been denied.

5. The method as described in claim 1 further comprising:

granting the requested access to a requested object in response to determining that the obtained permission indicates that access should be granted.

6. An apparatus comprising:

means, responsive to instantiation of a protection domain, for reading a policy configuration file having a list of granted and/or denied permissions, for retrieving the granted and/or denied permissions, and for associating the granted and/or denied permissions with a private attribute of a protection domain class;

means for defining a second attribute of the protection domain class to identify a permission as a statically or dynamically defined permission;

means for defining a third attribute of the protection domain class to identify whether to save a dynamically defined permission to the policy configuration file;

means, operative at an access control point during execution of a Java applet, for determining the protection domain of a class being examined;

means for accessing a private attribute of the associated protection domain class to obtain a permission that is identified by the second attribute of the protection domain class as a statically defined permission;

means for prompting a user to obtain a permission that is identified by the second attribute of the protection domain class as a dynamically defined permission;

means for analyzing the obtained permission to determine whether access to a requested object has been denied to the protection domain; and means for saving a dynamically defined permission into the policy configuration file in accordance with the third attribute of the protection domain class.

7. The apparatus as described in claim 6 further including means responsive to the analyzing means determining that the requested access has been denied for throwing an access exception and denying access to a requested object.

8. The apparatus as described in claim 6 further including means responsive to the analyzing means determining that the requested access has not been denied for determining whether the requested permission has been granted.

9. A computer program product in a computer readable medium for denying access to an object in a Java runtime environment, the computer program product comprising:

means, responsive to instantiation of a protection domain, for reading a policy configuration file having a list of granted and/or denied permissions, for retrieving the granted and/or denied permissions, and for associating the granted and/or denied permissions with a private attribute of a protection domain class;

means for defining a second attribute of the protection domain class to identify a permission as a statically or dynamically defined permission;

means for defining a third attribute of the protection domain class to identify whether to save a dynamically defined permission to the policy configuration file;

means, operative at an access control point during execution of a Java applet, for determining the protection domain of a class being examined;

means for accessing a private attribute of the associated protection domain class to obtain a permission that is identified by the second attribute of the protection domain class as a statically defined permission;

means for prompting a user to obtain a permission that is identified by the second attribute of the protection domain class as a dynamically defined permission;

means for analyzing the obtained permission to determine whether access to a requested object has been denied to the protection domain; and means for saving a dynamically defined permission into the policy configuration file in accordance with the third attribute of the protection domain class.

10. The computer program product as described in claim 9 further including means responsive to the analyzing means determining that the requested access has been denied for throwing an access exception and denying access to a requested object.

11. The computer program product as described in claim 9 further including means responsive to the analyzing means determining that the requested access has not been denied for determining whether the requested permission has been granted.

12. The computer program product as described in claim 11 further including means responsive to a determination that the requested access has been granted for granting a user access to a requested object.

13. A computer comprising:

a Java runtime environment;

means, responsive to instantiation of a protection domain, for reading a policy configuration file having a list of granted and/or denied permissions, for retrieving the granted and/or denied permissions, and for associating the granted and/or denied permissions with a private attribute of a protection domain class;

means for defining a second attribute of the protection domain class to identify a permission as a statically or dynamically defined permission;

means for defining a third attribute of the protection domain class to identify whether to save a dynamically defined permission to the policy configuration file;

means, operative at an access control point during execution of a Java applet, for determining the protection domain of a class being examined;

means for accessing a private attribute of the associated protection domain class to obtain a permission that is identified by the second attribute of the protected domain class as a statically defined permission;

means for prompting a user to obtain a permission that is identified by the second attribute of the protection domain class as a dynamically defined permission; means for analyzing the obtained permission to determine whether access to a requested object has been denied to the protection domain; and means for saving a dynamically defined permission into the policy configuration file in accordance with the third attribute of the protection domain class.

14. The computer as described in claim 13 further including means responsive to the analyzing means determining that the requested access has been denied for throwing an access exception and denying access to a requested object.

15. The computer program product as described in claim 14 further including means responsive to the analyzing means determining that the requested access has not been denied for determining whether the requested permission has been granted.

16. The computer as described in claim 15 further including means responsive to a determination that the requested access has been granted for granting a user access to a requested object.

* * * * *